Figure 1:
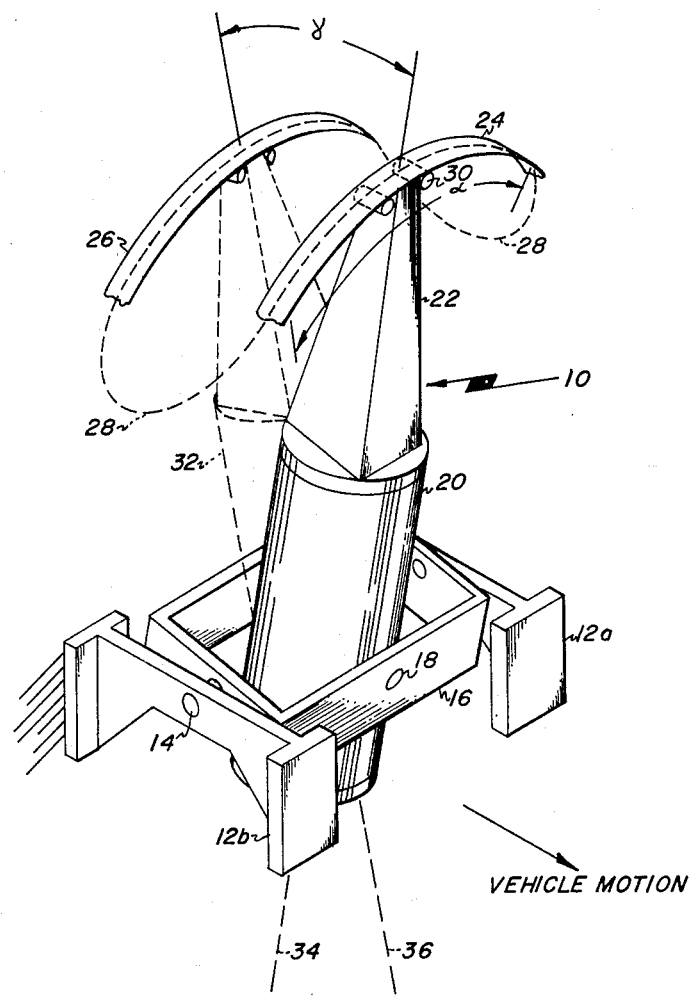

March 15, 1966  F. J. MADDEN  3,240,139
STEREOSCOPIC PANORAMIC CAMERA
Filed Oct. 14, 1963  3 Sheets-Sheet 1

INVENTOR.
FRANCIS J. MADDEN
BY
ATTORNEYS

INVENTOR.
FRANCIS J. MADDEN

March 15, 1966  F. J. MADDEN  3,240,139
STEREOSCOPIC PANORAMIC CAMERA
Filed Oct. 14, 1963  3 Sheets-Sheet 3

INVENTOR.
FRANCIS J. MADDEN
BY
ATTORNEYS

United States Patent Office 3,240,139
Patented Mar. 15, 1966

3,240,139
STEREOSCOPIC PANORAMIC CAMERA
Francis J. Madden, Wollaston, Mass., assignor to Itek Corporation, Lexington, Mass., a corporation of Delaware
Filed Oct. 14, 1963, Ser. No. 315,981
4 Claims. (Cl. 95—12.5)

This invention relates to photographic system and more particularly to a stereoscopic panoramic camera suited for aerial photography.

Three basic types of cameras are presently being used in the field of aerial photography namely, frame, strip and panoramic types. In a frame camera, the lens, acting as a perspective center, forms an image of the scene to be recorded over the full area of a single frame of film. Successive exposures are made at regular intervals as the camera passes over the terrain, with the intervals being timed so that a sufficient overlap is recorded on consecutive frames to completely record the area of interest.

A strip camera records a continuous strip of terrain as the aircraft progresses over it. In its simplest form, this camera consists of a fixed lens mounted in the camera which records on the film the scene that is directly below the aircraft. The shutter is kept open during the entire recording period and the exposure is controlled by a slit of variable width. During the recording or exposure period, the film is moved to compensate for the moving of the image produced by the motion of the aircraft.

The panoramic camera is also a scanning type of camera, but, unlike the strip camera, it sweeps the terrain of interest, from side to side across the direction of flight. This permits the panoramic camera to record a much wider swatch of ground than either the frame or strip camera. As in the case of the frame camera, continuous coverage is obtained by properly spaced exposures timed to give sufficient overlap between frames.

The advantages of stereoscopic aerial photography are manifold and well-known, hence, no detailed exegesis is necessary. Prior to my invention, however, the application of known stereoscopic principles to either the panoramic, frame or strip cameras created undesirable problems in instances where the system is to be used in aerial photographic work.

The most obvious and a common method of producing stereoscopic images is to use two cameras. The use of two cameras with their lens centers spaced apart of distance equal to the inter-pupillary distance, produces two images which, when properly viewed, produce a stereoscopic image. The obvious disadvantage is using two cameras is that the cost of such a system is double, but more important, when used in an aerial photographic system, the weight has been doubled. This is a luxury which cannot be afforded. Hence, this dual camera system is by far the least desirable.

Still another method of achieving stereoscopic images is to take a single cemera (lens, film, and drive mechanism and housing) and rock the camera from one position to another to take pictures at each extreme. It has been found that the dynamics of the rocking camera degrade the image and in any event requires consderably more power than is desirable. That is, the inertia that must be overcome to move the camera from one extreme to another, is extremely high.

Still another method of changing the viewing angle is the use of a mirror or a rotating prism to change the viewing angle. Here too, it has been found that any reflecting surface between the terrain and the lens tends to degrade the image to a point where it is almost unuseable.

In the present invention, a single lens is continuously rotated so that the opitcal axis of the lens traverses a first arc, in a given plane about a given fixed point, and, immediately thereafter, the optical axis is shifted such that it traverses another arc in a different plane, about the same point, but separated from the first arc by the stereoscopic convergence angle. Since there is no starting and stopping motion the image is not degraded nor is an excessive amount of power required to move the lens since only the lens is moved and not the entire camera.

It is, therefore, an important object of the present invention to provide a stereoscopic panoramic camera that is characterized by its light weight.

Still another important object of the present invention is to provide a stereoscopic panoramic camera that is continuously rotated to overcome the prior art inertia problem.

Yet another important object of the present invention is to provide a stereoscopic panoramic camera capable of being manufactured at a relatively low cost.

In accordance with the present invention there is provided a stereoscopic panoramic camera for stereoscopically recording information on film. The lens is mounted in a barrel and the barrel is mounted in a gimbal arrangement so that the barrel and lens may be inclined freely in any direction. A scan arm is interposed between the lens barrel and the film to maintain the film at the proper focal point through the travel of the scan arm.

Figure 2:
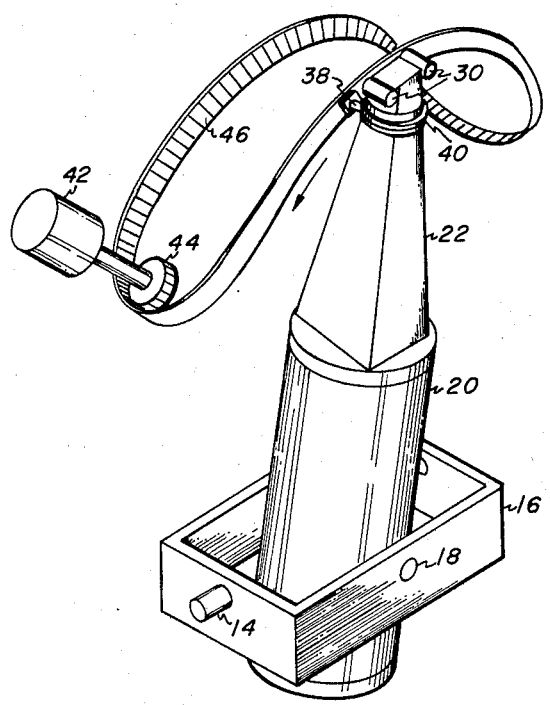
Figure 3:
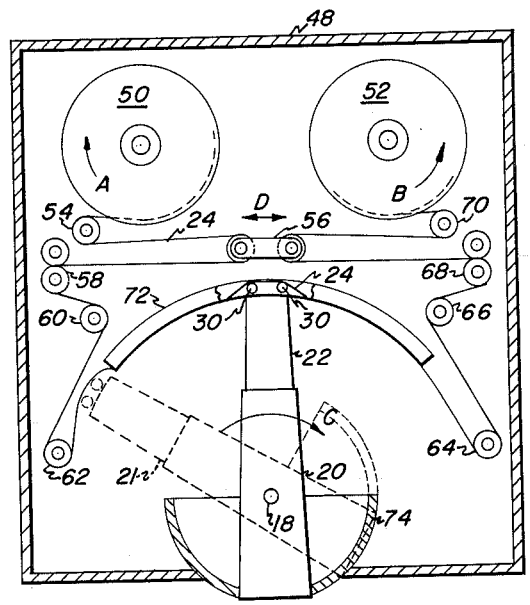
Figure 4:
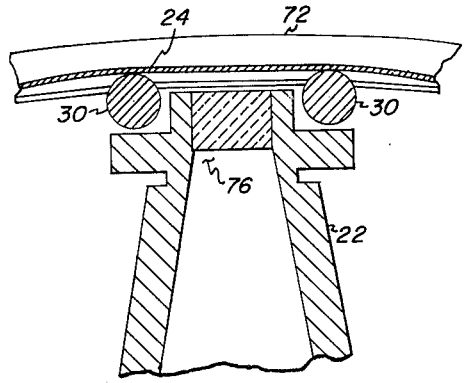

The features of my invention which I believe to be novel are set forth with particularity in the appended claims. My invention itself, however, both as to its organization and method of operation, together with further objects and advantages thereof, may best be understood by reference to the following description taken in conjunction with the accompanying drawings, in which:

FIG. 1 in which FIG. 1 is a perspective view of my novel stereoscopic panoramic camera mounted in the gimbals:

FIG. 2 is a perspective view of a drive mechanism for achieving the necessary motion:

FIG. 3 is a diagrammatic sectional view of a film feed mechanism which may be appropriately used with my stereoscopic panoramic camera: and FIG. 4 is an enlarged elevational view partially in section, taken along line 4—4 of FIG. 3 showing the film support rollers and the film. In the description that follows, it should be noted that similar elements in each of the figures will be similarly numbered.

Referring now to FIG. 1 for a description of the operation of my invention, it will be seen that outboard gimbals 12a and 12b may be mounted to a camera body (not shown). The lens assembly 10, consisting of scan arm 22 and a lens barrel 20, is shown pivotally mounted in inboard gimbal 16 by means for pivot 18 for movement through at least the panoramic angle $\alpha$. Inboard gimbal 16 is pivotally mounted to outboard gimbals 12a and 12b by means of pivot 14 for movement through the stereoscopic convergence angle $\gamma$.

By utilizing this mounting system, the scan arm and lens-barrel combination 10 and hence, the focal point and/or optical axis may be made to traverse along a path indicated by the dashed line 28. After exposure of the film indicated at 24, a shutter mechanism (not shown) may be used to prevent any further light from coming through the lens system and exposing the film. Thereafter, the whole assembly 10 traverses the curved portion of path 28 whereupon, the shutter opens and the portion of film 26, separated from film portion 24 by the stereoscopic convergence angle $\gamma$, is exposed. During its traverse across film portion 26, the lens barrel 20 and scan arm 22 have pivoted to occupy the position shown in phantom at position 32.

To complete one scan cycle, the scan arm 22 and lens barrel 20 (lens assembly 10) must traverse across and expose the film portions 24 and 26, and lens assembly 10 must traverse the panoramic angle α across portions 24 and 26. Since the path of the lens axis at the focal plane is described by dashed line 28, it then becomes obvious that the extension of the axis through the lens, when film portion 24 is being exposed, is the aft looking view and is indicated by the dashed line 34 while, when film portion 26 is being exposed, the extension of the lens axis through the lens represents the forward looking view, here shown by a dashed line 36 when the camera is mounted in a vehicle to which motion is imparted in the direction shown by the arrow.

During the exposure process, that is while film portions 24 and 26 are being exposed, rollers 30 maintain the proper distance between the film and the lens as will be described in more detail in connection with FIGS. 3 and 4.

Referring to FIG. 2 there is shown one method of driving the single stereoscopic panoramic lens to achieve the desired result. In this method of driving, the scan arm 22 and lens mount barrel 20 are shown pivotably mounted to the inboard gimbal 16 by means of pivot 18 while inboard gimbal 16 is mounted for movement to the outboard gimbals (not shown) by means of pivot 14.

In this particular method of driving, the scan arm 22 is pivotably and rotatably mounted by means of pin 38 to a toothed belt 46. The belt 46 is driven by means of motor 42 which may have a spur gear 44 which mates with the teeth in belt 46.

One end of the pivot 38 is affixed to the belt 46 while the other end thereof is affixed to a ball bearing race 40 mounted on scan arm 22. Thus, as the belt is driven in a track that is formed to maintain the configuration shown, the stereo mechanism 10 must also follow. Pin 38 pulls the scan arm 22 while ball bearing race 40 allows the scan arm 22 to easily turn the corners without excessive friction. Here also, rollers 30 performed the function of maintaining the film in the proper focal plane.

While film portions 24 and 26 (FIG. 1) may be separate portions of the same piece of film, to facilitate the description of the operation of my invention, I will describe the operative embodiment in terms of two distinct film feeds and takeup mechanisms.

Referring now to FIG. 3 for a detail description of one of the film mechanisms, there is shown a complete lens and film system enclosed within a suitable housing 48. For the sake of simplicity, the gimbal mechanism has not been shown. In the description of the foregoing operation it must be assumed that the film has been loaded in the manner as shown in FIG. 3 with shuttle 56 at the far left of its travel. While the film is in position for acual photographing, it is clamped to the rail 72 by means of a suitable clamping means (not shown). The feed spool 50 rotates in the direction of arrow A causing film 24 to travel around the idler roller 54, through shuttle 56, through metering rollers 58, around the idler rollers 60 and 62 and over the rails 72. Since film is being fed from the feed spool 50 in the direction indicated by arrow A at the same time as it is clamped to guide rails 72, the shuttle 56 moves toward the right as indicated by the arrow D to accommodate the increased length of film available for exposure. Simultaneously, the scan arm 22, the lens barrel 20 and the rollers 30 are pivoted about pivot point 18, progressing from position 21 to the far right as indicated by arrow C. The lens assembly 10 may be driven by the drive mechanism previously described with regard to FIG. 2. Light entering the lens element (not shown) mounted in housing 20 pass the light through scan arm 22, between the rollers 30 and onto film 24 to form an image thereon.

Referring now to both FIGS. 3 and 4, it will be seen that film 24 is lifted from the rails 72 by the rollers 30 which is disposed between the rails. The position of the focal plane of film 24, in the area where light is being imaged through the exposure slit, is established by the distance between rollers 30 and the scan tube 22. The rollers 30 and scan tube 22 establish the focal plane progressively at any sweep position of scan tube 22 on the film 24. The portion of film 24 that is not actually being photographed is supported by the guide rail 72 in an arcuate position. Film immediately adjacent the rollers, not being photographic, is raised slightly off the rail 72 as shown in FIG. 4. As previously described, the exposure slit 76 may contain an iris or a shutter mechanism therein for varying the amount of light passing through slit 76 or for cutting off all light when the lens assembly 10 progresses from the forward looking scanning position to the aft looking scanning position.

As scan tube 22 progresses from position 21 to a corresponding position at the other end of an arcuate rail 72, the light is cut off from slit 76 by any one of many well known means and the oscillating lens assembly 10 then turns the corner and moves over to the other (forward or aft) scanning position. Since the scan tube 22 has completed its sweep in so far as this view is concerned, the film 24 is ready to be moved so that another portion of film will be presented for exposure. The film 24 is then unclamped from guide rails 72 and is withdrawn from its exposure position in guide rails 72 by means of the takeup drive. The film is withdrawn around idler rollers 74 and 76, through takeup rollers 68, which operate only when the film is being withdrawn, around shuttle 56, idler roller 70 and onto takeup spool 62 in the direction indicated by the arrow B. The shuttle 56 then returns to the right, adjacent the takeup rollers 68, as unexposed film is simutaneously fed to the guide rails 72 by means of metering rollers 58 and idler rollers 54, 60 and 62.

During the period that the exposed, aft looking film portion is removed and replaced with an unexposed portion of film, the lens assembly 10 progresses across and exposes the forward looking film position 26 (FIG. 1), where a similar feed and takeup mechanism has previously brought an unexposed portion of film into position for the exposure operation. Once the lens assembly 10 has traversed across forward looking film portion 26 and an unexposed portion 24 has been appropriately placed in guide rail 72, the shutter mechanism closes slit 76, the lens assembly 10 turns the corner, the shutter opens and the cycle is ready to be repeated.

Coupled to the lens housing 22 is a semi-spherical piece 74 which oscillates with the lens assembly 10 and provides a light seal between the housing and the lens assembly. The center of rotation of piece 74 is coincident with the center of shaft 18 and may be arranged, if desired, to act as shutter for the slit 76 when the lens housing turns the corner and proceeds for example, from the forward looking view to the aft looking view or from the aft to the forward looking views.

While I have described what is presently considered the preferred embodiment of my invention, it will be obvious to those skilled in the art that various other changes and modifications may be made therein without departing from the inventive concept, and, it is aimed in the appended claims to cover all such changes and modifications as fall within the true spirit and scope of my invention.

What I claim is:

1. A stereoscopic panoramic camera system comprising:
   a lens system oscillating along a path defining a closed loop, the path having a pair of opposed parallel sections;
   a pair of film platens, spaced a predetermined distance one from the other, lying on the opposed parallel sections for holding a corresponding pair of film portions thereon in operative relationship with the lens system; and
   means oscillating the lens system across one of the pair of film portions to expose a scene thereon from one angle and then across the other of the pair of film portions to expose the same scene thereon from another angle.

2. A stereoscopic panoramic camera system comprising: gimbal means having at least a pair of axis of rotation;
   a lens system mounted in said gimbal means;
   a predetermined closed-loop path having first and second parallel sections;
   a first and second film strip;
   means for positioning said first film strip substantially within said first section of said closed-loop path and for positioning said second film strip substantially within said second section of said closed-loop path; and
   drive means for driving said lens system along said predetermined closed-loop path to first traverse said first film strip to project a scene thereon from one angle generated about one axis of said pair of axes and thereafter traverse said second film strip to project the same scene thereon from another angle generated about said one axis of rotation.

3. The combination as set forth in claim 2 further including film advancing means for removing the exposed film portions and for presenting unexposed film portions to the lens system.

4. The combination as set forth in claim 2 wherein said lens system has an optical axis, wherein said parallel sections of said predetermined closed-loop path and said first and second film strips are curved; and
   further including means for sequentially flattening increments of said film strips adjacent said optical axis to cause said increments of said film strips to be perpendicular to said optical axis during optical scanning.

References Cited by the Examiner

UNITED STATES PATENTS

| | | | |
|---|---|---|---|
| 1,277,919 | 9/1918 | Haworth | 325—69 |
| 1,837,467 | 12/1931 | McInnis | 325—69 |
| 3,016,001 | 1/1962 | Sonne | 95—15 |

JOHN M. HORAN, *Primary Examiner.*